United States Patent Office 3,734,927
Patented May 22, 1973

3,734,927
NOVEL MALEIMIDE AND AGRICULTURAL FUNGICIDE
Seigo Kawada, Kikukawa-machi, Hideo Ito, Shimizu, Kazuo Matsui, Komae-machi, and Hiroshi Kasugai, Tokyo, Japan, assignors to Kumiai Chemical Industry Co., Ltd., Tokyo, Japan
No Drawing. Filed Jan. 6, 1971, Ser. No. 104,464
Claims priority, application Japan, Jan. 10, 1970, 45/3,143
Int. Cl. C07d 27/18
U.S. Cl. 260—326.5 FM                    1 Claim

ABSTRACT OF THE DISCLOSURE

The novel compound, N-(4-fluorophenyl)-2,3-dichloromaleimide, has been found to possess good fungicidal properties, particularly for such plant diseases as tomato disease, rice blight, anthrax disease in cucumbers and black spot disease in citrus fruit. This compound can be effectively used in lower concentrations compared with previously known fungicidal maleimides.

BACKGROUND OF THE INVENTION

Field of the invention

The present invention relates generally to a novel maleimide composition and to a fungicide containing said maleimide therein as an active ingredient which is effective for protecting agricultural plants from detrimental parasitic microorganisms. More specifically, this invention relates to a fungicide containing N-(4-fluorophenyl) dichloromaleimide as the active ingredient.

Description of prior art

N-(4-methylphenyl)dichloromaleimide, N - cyclohexyl dichloromaleimide and the like are known to possess fungicidal activity and are known to be effective against various plant detriments. See, for instance, Japanese patent publication No. 12,798/1960 by Tenis and Lee. However, those dichloromaleimides have proven to be at least partially unsatisfactory for many plant applications.

For example, N-cyclohexyl dichloromaleimide has proven to be ineffective against rice blight, anthrax disease in cucumbers and black spot disease in citrus fruits at a concentration level of 500 p.p.m. Likewise, the fungicidal activity of N-(4-methylphenyl)dichloromaleimide is tremendously reduced at lower concentrations and is almost negligible against anthrax disease in cucumbers and black spot disease of citrus fruits.

A need exists therefore for a fungicidal composition which can exert fungicidal activity at lower concentration levels than required for the previously known maleimide compounds, and which is effective against a variety of plant detriments.

SUMMARY OF THE INVENTION

Accordingly, it is an object of this invention to provide the new compound N-(4-fluorophenyl)-2,3-dichloromaleimide.

It is another object of this invention to provide a fungicidal compound which is effective at lower concentrations.

Another object of this invention is to provide a fungicidal compound which can be used against a wide variety of plant detriments, and particularly rice blight, anthrax disease in cucumbers, black spot disease in citrus fruits and tomato disease.

These and other objects have now been attained by the discovery that the said N-(4-fluorophenyl)dichloromaleimide is prominently superior to N-(4-methylphenyl) dichloromaleimide and N-cyclohexyl dichloromaleimide with respect to the fungicidal activity.

DETAILED DESCRIPTION OF THE INVENTION

N-(4-fluorophenyl)dichloromaleimide melts at 245°–246° C. and can be prepared by reacting, for example, 4-fluoroaniline with dichloromaleic acid, dichloromaleic acid anhydride or an ester thereof.

Dichloromaleic acid, its corresponding anhydride or ester can be prepared by various methods. For example, dichloromaleic acid can be obtained by oxidizing 3-formyl-2,3-dichloroacrylic acid with fuming nitric acid (Ber. 38, 2588–90). Dichloromaleic anhydride can be obtained by reacting maleic anhydride with chlorine in the presence of iron (U.S.S.R. Pat. No. 43,419). The esters of dichloromaleic acid can be readily obtained from dichloromaleic acid or anhydride, with the corresponding alcohols.

A suitable solvent is preferably employed in the reaction of 4-fluoroaniline with dichloromaleic acid, etc. Suitable solvents include, for instance, the aromatic hydrocarbons, such as benzene, toluene and xylenes; chloroform, carbon tetrachloride and other chlorinated alkanes; acetone, methyl ethyl ketone and other ketones; methanol, ethanol, and other lower alcohols; lower carboxylic acids such as acetic acid; dioxane and the like. Especially good results are obtainable with acetic acid.

4-fluoroaniline may be used in an equimolar amount based on the dichloromaleic acid, anhydride, or ester, or may be used in an excess such as 2 moles/mole.

The reaction temperature is maintained at 10°–200° C., preferably at 40°–120° C., when dichloromaleic acid or its anhydride is used, whereas the temperatures may be selected within the range of 0–200° C., preferably 30°–120° C., when an ester of dichloromaleic acid is used.

The reaction time is not critical and can be selected over a wide range, for example, 0.1–20 hours; however, the reaction is usually complete within 1–3 hours.

After the reaction has been completed, the reaction mixture is either poured onto water, if the solvent is water-soluble, or the solvent is removed by distillation at reduced pressure, if the solvent is insoluble in water, to deposit crystals of the desired product. The thus obtained crude crystals are recrystallized from an organic solvent, such as acetone, to provide N-(4-fluorophenyl)-2,3-dichloromaleimide in good yield.

The desired product of the present invention can also be prepared by dehydrative cyclization of N-(4-fluorophenyl)-2,3-dichloromaleamic acid, thus N-(4-fluorophenyl)-2,3-dichloromaleamic acid is dissolved in one of the above-cited organic solvents and heated at 50°–200° C., preferably at 60°–130° C. Again, the period of heating is not especially critical and can be selected over a wide range of from 0.1–20 hours, although 1–3 hours is usually sufficient.

The reaction mixture after completion of the reaction is treated and purified as discussed above.

The starting material in the latter case, namely, N-(4-fluorophenyl)-2,3-dichloromaleamic acid can be prepared by reacting, for example, 3,4-dichloromaleic acid anhydride with 4-fluoroaniline at relatively low temperatures.

The following examples illustrate the preparation of N-(4-fluorophenyl)-2,3-dichloromaleimide which are presented herein for purposes of illustration only and are not intended to be limiting unless otherwise specified.

EXAMPLE 1

2,3-dichloromaleic anhydride 16.7 g. (0.1 mole) was dissolved in 70 ml. of glacial acetic acid. A solution of 4-fluoroaniline 11.1 g. (0.1 mole) dissolved in 30 ml. of glacial acetic acid was added dropwise at 15°–25° C., with stirring, over a period of 20 minutes. The mixture was warmed to 70°–80° C. and maintained at that temperature for 2 hours while stirring. Upon cooling to 15°–25° C., crystals were deposited which were filtered and washed with glacial acetic acid to provide 23.4 g. (yield, 90%) of crude N-(4-fluorophenyl)-2,3-dichloromaleimide, melting at 240°–242° C. Recrystallization of the crude crystallization of the crude crystals from acetone provided pale yellow plates, melting at 244.5°–245° C. The purified product gave a satisfactory elementary analysis as indicated below.

Calculated for $C_{10}H_4O_2NCl_2F$: C, 46.18; H, 1.55; N, 5.39; Cl, 27.27%. Found: C, 45.99; H, 1.57; N, 5.32; Cl, 27.34%.

EXAMPLE 2

To a mixture of 2,3-dichloromaleic anhydride, 15.1 g. (0.0903 mole) and 4-fluoroaniline 10.0 g. (0.0901 mole), 80 ml. of glacial acid was added. The resulting solution was heated under reflux for 3 hours and then cooled to 15°–25° C. The reaction mixture was poured into 1 l. of water, and the crystals precipitated out were collected by filtration and rinsed with water to provide 20.2 g. (yield, 86%) of crude N-(4-fluorophenyl)-2,3-dichloromaleimide melting at 238°–242° C. Recrystallization of the crude crystals from acetone provided pale yellow plates melting at 245°–246° C., which were identified as N-(4-fluorophenyl) - 2,3 - dichloromaleimide by mixed examination using an authentic specimen as obtained in Example 1.

EXAMPLE 3

2,3-dichloromaleic acid 18.5 g. (0.1 mole) was dissolved in 80 ml. of glacial acetic acid. A solution of 11.1 g. (0.1 mole) of 4-fluoroaniline dissolved in 20 ml. of glacial acetic acid was added dropwise with stirring at 15°–20° C. over a period of 20 minutes. The reaction mixture was stirred for an additional 3 hours at 70°–80° C. and allowed to cool to 15°–25° C. The precipitated crystals were collected by filtration, washed with glacial acetic acid to provide crude N-(4-fluorophenyl)-2,3-dichloromaleimide, melting at 238°–242° C., 21.3 g. (in 82% yield). The precipitate was recrystallized twice from acetone which provided pale yellow plates, melting at 245°–245.5° C. These were identified as the desired product on admixture with an authentic sample of N-(4-fluorophenyl)-2,3-dichloromaleimide obtained by Example 1.

EXAMPLE 4

2,3-dichloromaleic acid anhydride, 16.7 g. (0.1 mole) was dissolved in 50 ml. of benzene to which a solution of 11.1 g. (0.1 mole) of 4 fluoroaniline in 20 ml. of benzene was added dropwise with stirring at 15°–25° C., and the crystals formed by precipitation were filtered and rinsed with benzene to provide white crystals, melting at 222°–225° C., which were identified as N-(4-fluorophenyl)-2,3-dichloromaleamic acid, 26.3 g. (in 95% yield). The elemental analysis of the product is shown below:

Calculated for $C_{10}H_6O_3NCl_2F$: C, 43.19; H, 2.18; N, 5.04; Cl, 25.50%. Found: C, 42.86; H, 2.01; N, 4.72; Cl. 25.10%.

To 13.9 g. (0.05 moles) of N-(4-fluorophenyl)-2,3-dichloromaleamic acid obtained above, was added glacial acetic acid and the resulting solution was heated at 70°–80° C. for 2 hours and then allowed to cool to 15°–25° C. The crystals formed by precipitation were filtered and rinsed with glacial acetic acid to yield 10.8 g. (yield 83%) of crude N-(4-fluorophenyl)-2,3-dichloromaleimide, melting point of 234°–238° C. These crystals were twice recrystallized from acetone to provide pale yellow plates, melting at 244° C., which were identified as N-(4-fluorophenyl)2,3-dichloromaleimide by mixed examination using an authentic sample obtained in Example 1.

EXAMPLE 5

To 16.7 g. (0.1 mole) of 2,3-dichloromaleic acid anhydride was added 100 ml. of methyl alcohol. The mixture was refluxed for 10 hours while gaseous hydrogen chloride was passed through the reactants. Methanol and hydrogen chloride gas were removed by evaporation under reduced pressure and the residue was distilled to provide 17.1 g. of a fraction boiling at 102°–105° C./10 mm. Hg. This fraction was identified as dimethyl 2,3-dichloromaleate (yield 80%). The thus obtained 2,3-dichloromaleic acid dimethyl ester, 15 g. (0.0705 mole), was dissolved in 50 ml. of glacial acetic acid, to which a solution of 7.82 g. (0.0705 mole) of 4-fluoroaniline in 20 ml. of glacial acetic acid was added dropwise at 15°–25° C. with stirring over a period of 20 minutes. The reaction mixture was further stirred for 2 hours at 40°–60° C., and then glacial acetic acid was removed by distillation under reduced pressure to provide crude N-(4-fluorophenyl)-2,3-dichloromaleimide having a melting point of between 230°–235° C. The crude crystals were recrystallized twice from acetone to provide 13.75 g. (yield, 75%) of pale yellow plates, melting at 242°–244° C.

No lowering of the melting point was observed when these crystals were admixed with an authentic sample of N-(4-fluorophenyl)-2,3-dichloromaleimide obtained according to the method described in Example 1, and identified as the same compound thereby.

The compound according to the present invention has been proven to exert definite fungicidal activity at relatively low concentration levels compared with other known maleimide compounds. Its antimicrobial spectrum is rather broad, and so it is effective against a variety of plant detriments as indicated in Tables 1–5. Whereas, N-cyclohexyl dichloromaleimide is ineffective against the rice blight, anthrax disease in cucumbers and black spot disease in citrus fruits at a concentration level of 500 p.p.m.; and N-(4-methylphenyl)dichloromaleimide has little fungicidal activity at lower concentrations, especially against anthrax disease in cucumbers and black spot disease of citrus fruits, the compound of the present invention exerted a stable effect even at low concentration levels.

In addition, as shown in Table 5, the fungicidal effect of the compound obtained by the present invention when used in plantation yards was found to be stable and persisted for a relatively long period of time compared with similar compounds, which indicates the unique characteristics of the present compound.

The compound of this invention can be used in combination with conventional carriers (diluent), surfactants and the like, and can be used in the form of a powder, or a wettable powder. It can be directly applied by spraying or can be used after suitable dilution.

The carrier refers hereinafter to a carrier for carrying the active ingredient to the desired parts of the plant and may be either solid or liquid. For example, suitable solid carriers include various clays, talc, kaolin, diatomaceous earth, calcium carbonate, white carbon, sawdust and the like. Liquid carriers include solvents or non-solvents for the active ingredient and the present compound can be either dispersed or dissolved. Suitable liquid carriers include water, benzene, kerosene, alcohol, acetone, methylnaphthalene, xylene, and so on. Suitable surfactants include the non-ionic surfactants such as polyoxyethylene sorbitan monolaurate, etc.; cationic surfactants, such as alkyl dimethylbenzyl ammonium chloride, and higher alcohol sulfates; amphoteric surfactants, such as lauryl amine derivatives, betaine derivatives, dodecyl amino ethyl glycine, etc.

The mode of formulation of the fungicide composition of the present invention will be demonstrated by the following examples. Of course, the additive used and the proportion thereof may be varied as desired. All percents are by weight unless otherwise specified.

EXAMPLE 6—POWDER PREPARATION

A mixture comprising 2% of N-(4-fluorophenyl)-dichloromalimide and 98% of clay and talc was pulverized and the resulting fine powders were used as a fungicide.

EXAMPLE 7—WETTABLE POWDER PREPARATION

N-(4-fluorophenyl)dichloromaleimide 50%, a mixture of white carbon and diatomaceous earth 46%, sodium alkylbenzene sulfonate 2%, calcium lignin sulfonate 2% were blended and pulverized. The resulting fine powders were suspended in water and used as a fungicide.

EXAMPLE 8—WETTABLE POWDER PREPARATION

N-(4-fluorophenyl)dichloromaleimide 50%, diatomaeous earth 47Z, sodium dodecyl sulfate 1%, and polyvinyl alcohol 2% were blended and pulverized. The resulting fine powders were suspended in water and used as a fungicide.

Compounds of the present invention were compared with relevant reference compounds.

EXAMPLE 9— PROTECTION TEST ON TOMATO DISEASE

Tomato plants of 5–6 leaf age (species: Pond de Rosa) was sprayed with 30 cc. per stub of a suspension which was prepared by dilution of the wettable powder (Example 7) with water to the specified concentration. 30 days later, a suspension of a pathogenic microorganism cultured on a potato medium which causes infection of the tomato was used to innoculate the plants. Innoculation was accomplished by spraying. After innoculation, the tomato plants were placed in a humidic chamber at 24° C. for 1 day and night, and then removed to a greenhouse. The situation of the disease was examined after 6 days.

TABLE 1

| Concentration, p.p.m | Protection value (percent)[1] | | |
|---|---|---|---|
| | 500 | 250 | 125 |
| Test compound: | | | |
| N-(4-fluorophenyl)dichloromaleimide | 98.5 | 98.0 | 90.4 |
| N-(2-chlorophenyl)dichloromaleimide | 88.6 | 85.2 | 68.3 |
| N-(4-chlorophenyl)dichloromaleimide | 86.7 | 84.7 | 33.9 |
| N-(4-nitrophenyl)dichloromaleimide | 68.9 | 40.0 | 1.8 |
| N-(2-trifluoromethylphenyl)dichloromaleimide | 47.8 | 3.0 | 5.5 |
| N-(3-trifluoromethylphenyl)dichloromaleimide | 11.9 | 5.6 | 7.8 |
| N-(4-methylphenyl)dichloromaleimide | 88.0 | 80.9 | 61.7 |
| N-cyclohexyldichloromaleimide | 10.0 | 10.2 | 4.9 |
| Manganese ethylene bisdithiocarbamate | 98.2 | 95.5 | 89.2 |
| Untreated zone | 0 | 0 | 0 |

[1] Protection value percent was calculated according to the following formula:

$$\frac{\text{Number of diseased cases in the untreated zone} - \text{Number of diseased cases in the treated zone}}{\text{Number of diseased cases in the untreated zone}} \times 100$$

EXAMPLE 10—PROTECTION TEST AGAINST RICE BLIGHT

Rice plants of 5–6 leaf age (species: Kinmaze) was sprayed with 30 cc. per pot of the suspension of wettable powder (Example 8) of the present invention; 3 days later, the rice plants were innoculated by spraying with a suspension containing spores of pathogenic microorganism collected from the blighted leaves of diseased rice. The plants were allowed to stand in a humidic chamber at 24° C. and the infection situation was examined after 7 days.

TABLE 2

| Concentration, p.p.m | Protection value (percent)[1] | | |
|---|---|---|---|
| | 250 | 125 | 62.5 |
| Test compound: | | | |
| N-(4-fluorophenyl)dichloromaleimide | 98.0 | 97.2 | 89.4 |
| N-(4-chlorophenyl)dichloromaleimide | 93.3 | 92.9 | 43.1 |
| N-(4-nitrophenyl)dichloromaleimide | 82.9 | 67.1 | 25.4 |
| N-(2-trifluoromethylphenyl)dichloromaleimide | 44.3 | 40.1 | 44.0 |
| N-(3-trifluoromethylphenyl)dichloromaleimide | 69.8 | 40.5 | 36.6 |
| N-(4-methylphenyl)dichloromaleimide | 97.6 | 85.3 | 63.1 |
| N-cyclohexyldichloromaleimide | 29.8 | 25.8 | 21.4 |
| Pentachlorobenzyl alcohol | 99.2 | 90.0 | 87.2 |
| Untreated zone | 0 | 0 | 0 |

[1] Protection value (percent):

$$\frac{\text{Number of infected spots in the untreated zone} - \text{Number of infected spots in the treated zone}}{\text{Number of infected spots in the untreated zone}} \times 100$$

EXAMPLE 11.—PROTECTION TEST AGAINST ANTHRAX DISEASE IN CUCUMBERS

Potted cucumber plants at the cotyledon period (species: sagami semi-white) were sprayed with 20 cc. per pot of a suspension of wettable powder of the present invention (Example 7), and after 3 days were inoculated with a spore suspension of the cucumber anthrax disease cultured on corn extract agar media. After inoculation, the test plants were placed in a humidic chamber at 27° C., then removed to a greenhouse, and the infected spots were examined after 7 days. The number of the infected spots per seed leaves of 10 cucumbers were counted and the protection value computed from the ratio to the number of the infected spots in the untreated zone.

TABLE 3

| Concentration, p.p.m | Protection value (percent) | | | |
|---|---|---|---|---|
| | 500 | 250 | 125 | 62.5 |
| Test Compound: | | | | |
| N-(4-fluorophenyl)dichloromaleimide | 99.5 | 98.8 | 86.0 | 81.2 |
| N-(4-chlorophenyl)dichloromaleimide | 97.9 | 80.5 | 15.2 | 19.7 |
| N-(4-nitrophenyl)dichloromaleimide | 11.5 | 22.3 | 0 | 0 |
| N-(2-trifluoromethylphenyl)dichloromaleimide | 0 | 0 | 0 | 0 |
| N-(3-trifluoromethylphenyl)dichloromaleimide | 0 | 6.0 | 0 | 0 |
| N-(4-methylphenyl)dichloromaleimide | 99.2 | 61.6 | 0 | 0 |
| N-cyclohexyldichloromaleimide | 0 | 0 | 8.7 | 0 |
| Zinc ethylene bisdithiocarbamate | 94.1 | 86.8 | 82.3 | 30.0 |

EXAMPLE 12.—PROTECTION TEST AGAINST CITRUS BLACK SPOT DISEASE

Potted citrus seedlings (species: ordinary Unshu tangerine) were sprayed with 600 l./10 are per pot of the suspension of the wettable powder of the present invention (Example 8), and 2 days later were inoculated by spraying a spore suspension of a pathogenic citrus black spot fungus cultured on decayed tangerine branches. The plants were allowed to stay in a humidic chamber at 25° C. for 2 days, then removed to a greenhouse. The situation of the disease was examined after 24 days.

TABLE 4

| Concentration, p.p.m | Protection value (percent)[1] | | |
|---|---|---|---|
| | 500 | 250 | 125 |
| Test Compound: | | | |
| N-(4-fluorophenyl)dichloromaleimide | 100 | 100 | 100 |
| N-(4-chlorophenyl)dichloromaleimide | 87.5 | 44.0 | 23.0 |
| N-(4-nitriphenyl)dichloromaleimide | 46.6 | 8.1 | 3.5 |
| N-(2-trifluoromethylphenyl)dichloromaleimide | 43.1 | 7.5 | 2.4 |
| N-(3-trifluoromethylphenyl)dichloromaleimide | 11.1 | 5.3 | 14.2 |
| N-(4-methylphenyl)dichloromaleimide | 91.3 | 33.3 | 25.3 |
| N-cyclohexyldichloromaleimide | 19.6 | 10.0 | 6.4 |
| N-tetrachloroethylthiotetrahydrophthalimide | 100 | 100 | 95.0 |

[1] Protection value (percent):

$$1 - \frac{\text{Number of slightly diseased leaves} \times 1 + \text{Number of medium diseased leaves} \times 2 + \text{Number of heavily diseased leaves} \times 3}{\text{Number of total leaves} \times 3} \times 100$$

EXAMPLE 13.—RESIDUAL EFFECT TEST AGAINST CITRUS BLACK SPOT DISEASE

The wettable powder of the present invention (Example 8) was diluted to 1000 p.p.m. and amounts corresponding to 600 l per 10 acre were sprayed onto a yard of 8-year-old "Unshu tangerine" trees. The fruits after 5, 18, and 21 days were collected in a ratio of 20 per zone, and were spray inoculated with a spore suspension of citrus black spot disease fungus cultured on decayed tangerine branches. They were then allowed to stay in a humidic chamber at 25° C. for 2 days, then removed to a greenhouse, and the situation of the disease was examined after 5 days. The plants were subjected to rain for periods of 5 days, 18 days, and 21 days after the spraying of the fungicide. The quantity of rain was measured at 5.3 mm., 18.6 mm. and 96.2 mm., respectively.

TABLE 5

| Days after innoculation | Protection value (percent)[1] | | |
|---|---|---|---|
| | 5 | 18 | 21 |
| Test Compound: | | | |
| N-(4-fluorophenyl)dichloromaleimide | 99.8 | 98.1 | 95.2 |
| N-(4-chlorophenyl)dichloromaleimide | 95.6 | 40.9 | 0 |
| N-(4-nitrophenyl)dichloromaleimide | 73.9 | 0 | 7.3 |
| N-(2-trifluoromethylphenyl)dichloromaleimide | 73.9 | 15.0 | 0 |
| N-(3-trifluoromethylphenyl)dichloromaleimide | 82.5 | 20.1 | 0 |
| N-(4-methylphenyl)dichloromaleimide | 95.6 | 57.6 | 14.2 |
| N-cyclohexyldichloromaleimide | 47.8 | 5.1 | 3.1 |
| Zinc ethylene bisdithiocarbamate | 86.9 | 68.2 | 68.3 |
| Manganese ethylene bisdithiocarbamate | 95.6 | 85.0 | 83.5 |

[1] The effective concentration adopted was 1,000 p.p.m. in each case. Protection value (percent):

$$1 - \frac{\text{Number of slightly diseased fruits} \times 1 + \text{Number of medium diseased fruits} \times 2 + \text{Number of heavily diseased fruits} \times 3}{\text{Number of total fruits} \times 3} \times 100$$

Having now fully described the invention, it will be apparent to one of ordinary skill in the art that many changes and modifications can be made without departing from the spirit or scope of the invention. Accordingly, what is claimed as new and desired to be secured by Letters Patent of the United States is:

1. N-(4-fluorophenyl)-2,3-dichloromaleimide.

References Cited

UNITED STATES PATENTS

| 2,962,504 | 11/1960 | Walker et al. | 260—326.5 |
| 3,018,292 | 1/1962 | Sauers et al. | 260—326.5 |
| 3,129,225 | 4/1964 | Shapiro et al. | 260—247.2 |
| 3,148,196 | 9/1964 | Ladd | 260—326.5 |

ALEX MAZEL, Primary Examiner

J. A. NARCAVAGE, Assistant Examiner

U.S. Cl. X.R.

424—274